Jan. 3, 1939.  W. J. JOHNSTON  2,142,850
AXLE STRAIGHTENER
Filed Dec. 3, 1936
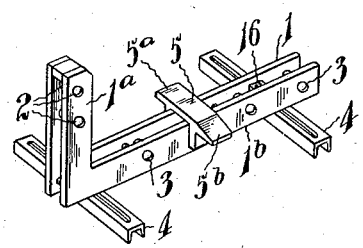
Inventor
W. J. Johnston
by
J. Edw. Maybee
ATTY.

Patented Jan. 3, 1939

2,142,850

UNITED STATES PATENT OFFICE 2,142,850

AXLE STRAIGHTENER

William James Johnston, London, Ontario, Canada, assignor to Albert Speare Lashbrook, London, Ontario, Canada Application December 3, 1936, Serial No. 114,001

8 Claims. (Cl. 153—32)

This invention relates to axle straighteners and more particularly to the type for bending and twisting axles of motor vehicles and my object is to provide simple apparatus of this character which is cheap to manufacture, yet rugged in construction and adapted for use on axles either on or off the vehicles. A further object is to so construct the apparatus that it may be readily handled in a minimum of space and with a minimum of effort both in making the necessary hook-ups for performing different operations and in doing them.

I attain my objects by providing legs for supporting the apparatus when it is desired to bend an axle longitudinally of a vehicle to which the axle is attached. The apparatus includes a rigid member which is secured to the axle or to a part connected therewith before performing any operation. A jack engaging the rigid member is used to apply pressure to the axle by direct engagement therewith or through the medium of a jaw embracing the axle when it is desired to twist the axle. The jaw is provided with an adjustable arm for facilitating the twisting of the axle.

The constructions are hereinafter more fully described and are illustrated in the accompanying drawing in which—

Fig. 1 is a perspective view of the rigid member of my device;

Fig. 2 a front elevation of a part of a vehicle showing the axle thereon being bent upwardly;

Fig. 3 a front elevation of an axle showing it being bent downwardly by an upward pressure;

Fig. 4 a perspective view of part of a vehicle showing the axle thereon being bent longitudinally of the vehicle;

Fig. 5 a front elevation of part of a vehicle showing the axle twisting attachment;

Fig. 6 a cross-section on the line 6—6 in Fig. 5; and

Fig. 7 a cross-section on the line 7—7 in Fig. 5.

In the drawing like numerals of reference indicate corresponding parts in the different figures.

1 is a rigid member which may be formed of two parts rigidly secured together in spaced relationship to one another as shown. The member 1 is preferably of L-shape, the upright extension 1$^a$ thereof being provided with a series of holes 2 and the base portion 1$^b$ being provided with a series of holes 3. To the base portion 1$^b$ of the member are secured legs 4 which extend laterally from both sides of the base 1$^b$ and are adapted to rest on a floor to prevent the tipping of the member when in an upright position. Preferably a saddle 5 is slidably supported on the base portion 1$^b$ and is provided with lateral extensions 5$^a$, 5$^b$.

In Fig. 2 is illustrated the hook-up for bending an axle 6 upwardly without removing it from the vehicle. A short clevis 7 engaging the upper surface of the axle is connected with the extension 1$^a$ by a bolt 8 passed through one of the holes 2. The other end of the member 1 is connected with the axle by a long clevis 9 having a bolt 10 passed through one of the holes 3. The jack 11 rests on the saddle 5 and engages the underside of the axle between the clevises 7, 9. If the short clevis 7 is engaging the upwardly inclined outer end of the axle, a distance block 12 is inserted between the clevis and a part of the vehicle such as the adjacent spring to prevent displacement of the clevis. By shifting the long clevis relative to the short clevis and the jack relative to the clevises, the straightening bends in the axle may be made long or short to suit the requirements necessary to straighten the axle.

In Fig. 3 is shown part of an axle removed from a vehicle and being bent downwardly by an upward pressure of the jack 11. In this case, the axle is secured to the end of the extension 1$^a$ by means of a clamp 13. If the axle were on the vehicle, the clevis 7 would be used to secure the member to the axle and the clamp 13 would not be required in this case.

The clamp 13 would be substituted for the clevis 7 in Fig. 2, if it is desired to bend the axle upwardly and the axle has first been removed from a vehicle.

In Fig. 4 is illustrated the hook-up for bending an axle longitudinally of a vehicle while connected with the vehicle. The hook-up here is similar to that shown in Fig. 3 except that the rigid member 1 has been swung 90° about the axle so that its sides are now parallel to the floor and the end of the extension 1$^a$ engages a block 14 bearing against the front side of the axle. To support the member 1 in this position the legs 4 are adjustably carried by the member so that the ends of the legs will rest on the floor. The adjustable connection between the legs and member 1 may be formed by bolt and slot connections 15 in these parts. The bolts are carried by lugs or distance pieces 16 extending across the space between the two parts of the member 1 whereby the surfaces of the base portions 1$^b$ on which the saddle 5 rests are clear to permit the shifting of the saddle to any position longitudinally thereof. By operating the jack, pressure is exerted against the axle to cause it to bend rearwardly of the vehicle. It will be noted that the extension 1ᵃ on the member 1 enables this operation to be performed without the need of a second jack or a separate distance piece between one end of the member and the axle.

Referring to Fig. 4, if it is desired to bend the axle forwardly of the vehicle, the clevis 7 is connected with the extension 1ᵃ after being positioned around the axle, and the jack is shifted to a position between the clevises 7 and 9. In other words, the hook-up in this case is similar to that shown in Fig. 2 except that the member 1 is supported by the ends of the legs 4 in front of the axle so that the latter may be bent longitudinally of the vehicle.

When it is necessary to twist an axle to straighten it without removing it from a vehicle, I connect the member 1 with the axle by an L-shaped bar 17 and the clevis 7, see Figs. 5, 6 and 7. One leg 17ᵃ of the bar 17 passes beneath the axle 6 and the other leg 17ᵇ engages the rear edge of the spring support 6ᵃ formed on the axle and abuts the underside of the spring 18 secured to said support. The clevis 7 is passed around the upper side of the spring 18 and the clevis bolt 8 engages one of a series of notches 19 formed in the underside of the leg 17ᵃ. The end of the leg 17ᵃ is secured by a bolt 20 to the extension 1ᵃ of the member 1. It will be noted that in this case the bolt 20 passes through the space between the two parts of the extension and not through any of the holes 2. The hereinbefore mentioned block 14 is provided with an opening (not shown) which is spaced an unequal distance from its edges. If it is desired to employ the block to engage the bolt 20, the block is inserted in the space between the two parts of the extension 1ᵃ and turned until one edge contacts with the bolt 20 and the opening is registered with one set of holes 2. The block is secured as thus positioned by a bolt passing through said opening and holes. In practice, the bolt 20 will hold the end of the bar 17 from movement during the most severe twisting operations and the use of the block is not necessary except as an emergency in an extraordinary case.

The twisting of the axle is accomplished by the jack 11 which, in this case, engages the underside of the rounded end 21ᵃ of an arm 21 carried by a jaw 22 having a U-shaped recess adapted to receive that portion of the axle to be twisted. To facilitate the operation of the jack and to obtain the best results with a minimum of effort on the part of the operator and the mechanism, the connection between the arm 21 and the jaw 22 is adjustable whereby the position and angle of the arm relative to the movable head of the jack and the line of travel thereof may be respectively kept similar in the majority of cases. That is to say, for different degrees of axle bends, the angle of the arm 21 to the line of travel of the head of the jack need not differ and the arm may also be positioned close to the lowered position of the head of the jack at the commencement of each twisting operation. The arm 21 is pivoted at 23 on a lug 24 formed on one side of the jaw 22. On the arm is pivoted one end of a link 25 having a series of holes 26 at its other end. Beneath the lug 24 is another lug 27 having an opening therein for receiving a pin or bolt 28 which is adapted to be passed through any one of the holes 26 in the link to thus vary the position of the arm 21 relative to the jack head. If necessary, in extreme cases the jack may be shifted on the saddle 5 to engage the extension 5ᵃ thereof.

To twist the axle in the direction opposite that obtained with the parts positioned as in Figs. 5, 6 and 7, it would be merely necessary to reverse the parts relative to the axle.

The side of the jaw 22 remote from the lugs 24 and 27 is provided with a projection 29. By resting the jack on the inclined extension 5ᵇ it may be engaged with either the projection 29 or the lug 27 to straighten a slight twist in the axle.

What I claim as my invention is:

1. A vehicle axle straightener comprising a rigid member; a substantially L shaped bar having two legs, one leg being secured to said member and extended beneath an axle to be twisted while the axle is on the vehicle, the second leg being engaged with one side of the axle and abutted against one side of a part of the vehicle secured to the axle; means connecting the first mentioned leg of said L shaped bar with said part of the vehicle at the opposite side of said axle from said second leg; and means co-operating with said member for twisting the axle.

2. A vehicle axle straightener comprising a rigid member having an upright extension; a substantially L shaped bar having two legs, one leg being secured to said extension and extended beneath an axle to be twisted while the axle is on the vehicle, the second leg being engaged with one side of the axle and abutted against one side of a part of the vehicle secured to the axle; a clevis positioned at the other side of the axle, the clevis being engaged with the underside of the first leg and a side of the said part of the vehicle opposite that against which the second leg is abutted; and means co-operating with said member for twisting the axle.

3. A vehicle axle straightener comprising a rigid member having an upright extension; a substantially L shaped bar having two legs, one leg being secured to said extension and extended beneath an axle to be twisted while the axle is on the vehicle, the said leg having a series of notches in its underside, the second leg being engaged with one side of the axle and abutted against one side of a part of the vehicle secured to the axle; a clevis positioned at the other side of the axle and engaged with a side of the said part of the vehicle opposite that against which the second leg is abutted, the clevis having a bolt for engaging one of the series of notches; and means cooperating with said member for twisting the axle.

4. A vehicle axle straightener comprising a rigid member; means associated with said member and a portion of an axle to be twisted so that said portion of the axle will be held from twisting; a device for embracing another portion of the axle; an arm pivoted on said device; and adjustable means for locking said arm from movement relative to the device, the rigid member and the arm being adapted for engagement by pressure applying means to cause the axle to be twisted.

5. A vehicle axle straightener comprising a rigid member; means associated with said member and a portion of an axle to be twisted so that said portion of the axle will be held from twisting; a device for embracing another portion of the axle; an arm pivoted on said device; a link pivoted on said arm and having a series of holes;

and means adapted to pass through any one of said holes for securing the link to the device at a point distant from the pivot of the arm, the rigid member and the arm being adapted for engagement by pressure applying means to cause the axle to be twisted.

6. A vehicle axle straightener comprising a rigid member; means for securing said member to a part of the vehicle to which one portion of an axle to be twisted is attached so that the rigid member will resist a twisting movement of said portion; a jaw for receiving another portion of the axle to be twisted; and an arm adjustably carried by said jaw to vary the angular relationship between said arm and jaw, the rigid member and the arm being adapted for engagement by pressure applying means to cause the axle to be twisted.

7. A vehicle axle straightener comprising a rigid member; a substantially L shaped bar having two legs, one leg being secured to said member and extended beneath an axle to be twisted while the axle is on the vehicle, the second leg being engaged with one side of the axle and abutted against one side of a part of the vehicle secured to the axle; means connecting the first mentioned leg of said L shaped bar with said part of the vehicle at the opposite side of said axle from said second leg; a device for embracing a portion of the axle; an arm pivoted on said device; and adjustable means for locking said arm from movement relative to the device, the rigid member and the arm being adapted for engagement by pressure applying means to cause the axle to be twisted.

8. A vehicle axle straightener comprising a rigid member having an upright extension; means associated with said extension and a portion of an axle to be twisted so that said portion of the axle will be held from twisting; a device for embracing another portion of the axle; an arm pivoted on said device; and adjustable means for locking said arm from movement relative to the device, the rigid member and the arm being adapted for engagement by pressure applying means to cause the axle to be twisted.

WILLIAM JAMES JOHNSTON.